(12) United States Patent
Petersen et al.

(10) Patent No.: US 8,384,915 B2
(45) Date of Patent: Feb. 26, 2013

(54) TEST BLOCK FOR USE IN A WELDING PROCESS

(75) Inventors: Eric P. Petersen, Minnetonka, MN (US); Daniel S. Sampson, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 257 days.

(21) Appl. No.: 12/896,003

(22) Filed: Oct. 1, 2010

(65) Prior Publication Data

US 2012/0081713 A1 Apr. 5, 2012

(51) Int. Cl.
*G01B 11/22* (2006.01)
(52) U.S. Cl. ..... 356/625; 356/632; 73/715; 219/121.83; 219/130.01
(58) Field of Classification Search .......... 356/625–632; 219/73.2, 130.1, 121.83, 121.64, 121.63, 219/124.34, 130.01; 73/706, 716, 715, 723; 228/104, 119, 56.5
See application file for complete search history.

(56) References Cited

U.S. PATENT DOCUMENTS

| | | | |
|---|---|---|---|
| 4,120,206 A | 10/1978 | Rud, Jr. ............................. 73/718 |
| 4,370,890 A | 2/1983 | Frick ................................ 73/718 |
| 4,612,812 A | 9/1986 | Broden ............................ 73/718 |
| D317,266 S | 6/1991 | Broden et al. ..................... 10/46 |
| 5,061,841 A * | 10/1991 | Richardson .............. 219/130.01 |
| 5,249,727 A | 10/1993 | Eberle et al. .................... 228/104 |
| 5,738,268 A | 4/1998 | VanderPol et al. ............. 228/103 |
| 5,756,967 A * | 5/1998 | Quinn et al. ............. 219/130.21 |
| 6,003,219 A | 12/1999 | Frick et al. ................... 29/25.41 |
| 6,595,402 B2 | 7/2003 | Nakamura et al. ............ 228/104 |
| 6,647,794 B1 | 11/2003 | Nelson et al. ................... 73/718 |
| 6,901,803 B2 | 6/2005 | Fandrey ........................... 73/706 |
| 7,401,522 B2 | 7/2008 | Broden et al. .................. 73/716 |
| 2004/0011773 A1* | 1/2004 | Fritz et al. ................. 219/121.83 |
| 2004/0038120 A1* | 2/2004 | Tsai et al. ........................ 429/66 |
| 2009/0188968 A1 | 7/2009 | Marie ......................... 228/112.1 |

FOREIGN PATENT DOCUMENTS

| | | |
|---|---|---|
| CN | 201288915 Y | 8/2009 |
| FR | 2 692 670 | 12/1993 |
| JP | 59-212767 | 12/1984 |
| JP | 4-153006 | 5/1992 |

OTHER PUBLICATIONS

"Welding:Principles & Practices" —revised by Raymond Sacks, copyright 1981; 44 pages.
International Search Report for PCT Application No. PCT/US2011/053918, dated Dec. 23, 2011, 5 pages.
Written Opinion for corresponding International Search Report for PCT Application No. PCT/US2011/053918, dated Dec. 23, 2011, 6 pages.
Office Action from Chinese Application No. 201120371951.1, dated Feb. 22, 2012.

\* cited by examiner

*Primary Examiner* — Hoa Pham
(74) *Attorney, Agent, or Firm* — Westman, Champlin & Kelly, P.A.

(57) ABSTRACT

A method and test block for controlling weld penetration depth in a work piece are disclosed. The test block simulates a work piece relative to a welding process of the work piece. The test block includes a test welding path. The test welding path replicates a production welding path on a weld surface of the work piece. The test block includes a melt-thru surface that underlies the test welding path. The melt-thru surface is spaced apart from the test welding path by a spacing that decreases along a length of the test welding path. The spacing varies from more than a standard weld penetration depth to less than the standard weld penetration depth.

17 Claims, 10 Drawing Sheets

TEST BLOCK FOR USE IN A WELDING PROCESS

BACKGROUND OF THE INVENTION

The present application relates to welding a work piece and in particular to a test block for use in a welding process.

In many situations it is desirable to accurately control the machining and fabrication of precision components. One such device is a pressure transmitter used to measure pressure of a process fluid in an industrial process. A pressure sensor used in such a transmitter often includes a metal outer structure that is welded together in order to contain pressure. The welds in pressure sensors are subjected to forces due to sensed pressures that exceed the ratings of the pressure sensor, in other words, forces due to overpressures under fault conditions.

Various methods for qualifying welding processes for use in production of pressure sensors are known. Typically production pressure sensors are prepared and welded, and the parts are tested according to a quality sampling plan. Based on the testing results, a welding process may be qualified for use in a particular pressure sensor production process, or changes may be made to the welding process if the test results reveal deficiencies. Many welding tests are destructive tests that involve hazardous steps. These destructive tests may include applying large forces to bend or break the weld, cutting a cross section through the weld and polishing and etching the cross section with acid to reveal defects. Other welding tests are non-destructive tests. These non-destructive tests include X-ray imaging and ultrasound testing. Non destructive tests typically are expensive and time consuming to perform, and require skilled operators on non destructive imaging equipment.

SUMMARY OF THE INVENTION

In the embodiments described below, a method and test block for controlling weld penetration depth in a work piece are disclosed. The test block simulates a work piece relative to a welding process of the work piece. The test block includes a test welding path. The test welding path replicates a production welding path on a weld surface of the work piece. The test block includes a melt-thru surface that underlies the test welding path. The melt-thru surface is spaced apart from the test welding path by a spacing that decreases along a length of the test welding path. The spacing varies from more than a standard weld penetration depth to less than the standard weld penetration depth.

DETAILED DESCRIPTION

In the embodiments described below, a quality control process and apparatus are described that are useful in manufacturing process transmitters, particularly pressure transmitters that include a welded pressure sensor. However, the invention may be used with any work piece and is not limited to the specific examples described herein. In the quality control process, a test block is provided that simulates a pressure sensor in a welding process. The test block has a test welding path that replicates a production welding path on the work piece. The test block is provided with a melt-thru surface that is spaced apart from the test welding path by a spacing that decreases along a length of the test welding path. The spacing varies from more than a standard weld penetration depth to less than a standard weld penetration depth. Measurement of the location of melt-thru indicates a numerical value of weld penetration depth and permits statistical process control of the welding process without destructive testing of a production work piece.

Figure 1:
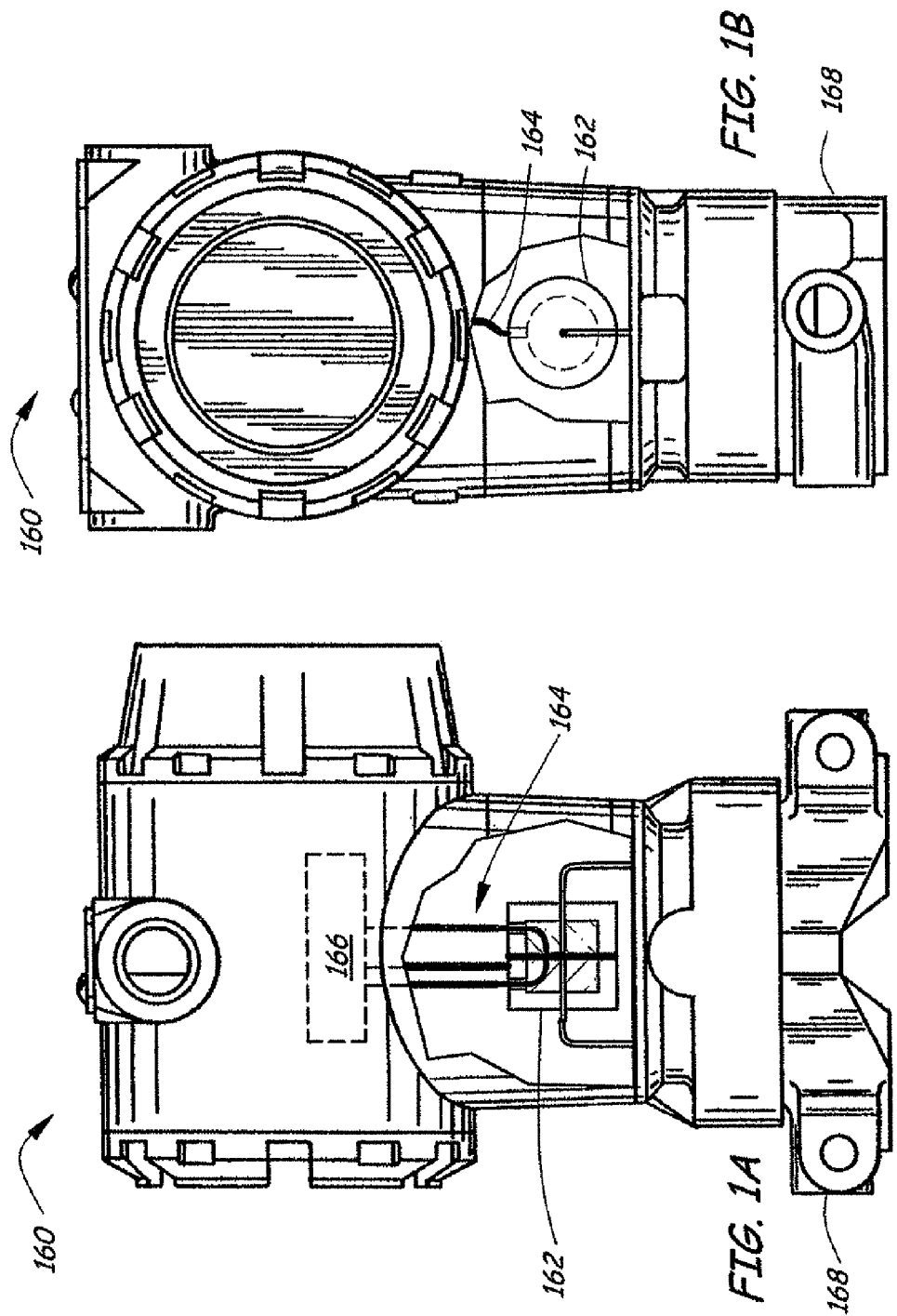
FIGS. 1A, 1B illustrate a process variable transmitter that includes a welded pressure sensor that is welded with a weld penetration depth that is controlled by the use of a test block.

FIGS. 1A, 1B illustrate front and side views of a process variable transmitter 160. In FIGS. 1A, 1B, a portion of the transmitter 160 is broken away to illustrate a location of pressure sensor 162. The process variable transmitter 160 includes the pressure sensor 162. The pressure sensor 162 comprises a welded pressure sensor that is welded with a weld penetration depth that is controlled by the use of a test block as described in more detail below in connection with examples shown in FIGS. 3-10. The pressure sensor 162 provides a pressure sensor signal on lines 164 to electronics 166. The electronics 166 is described in more detail below in connection with an example illustrated in FIG. 2. The pressure transmitter 160 is connectable to a pressure flange 168 for sensing differential pressure in industrial process fluids.

Figure 2:
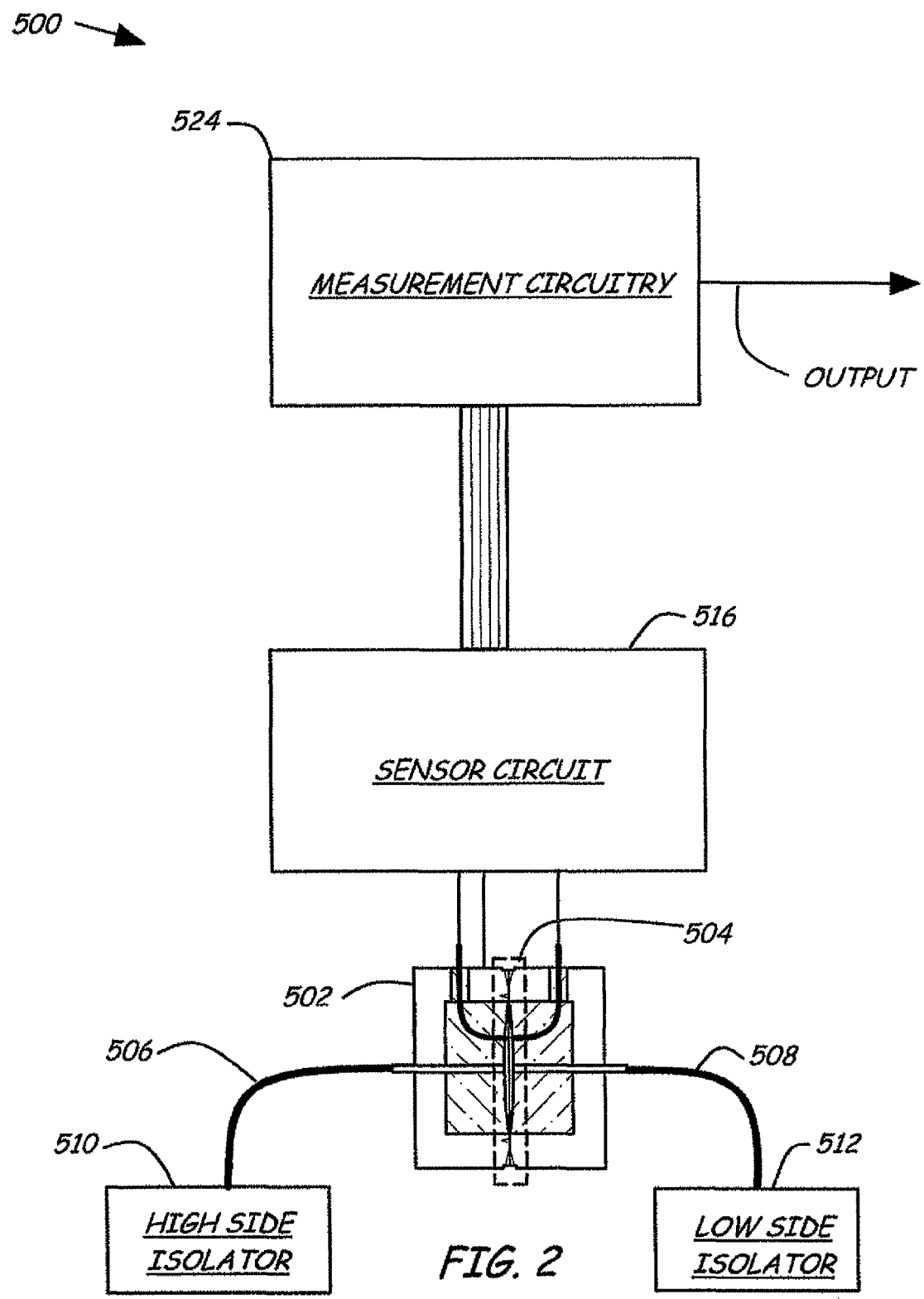
FIG. 2 illustrates a block diagram of a process variable transmitter that includes a welded pressure sensor that is welded with a weld penetration depth that is controlled by the use of a test block.
Figure 3:
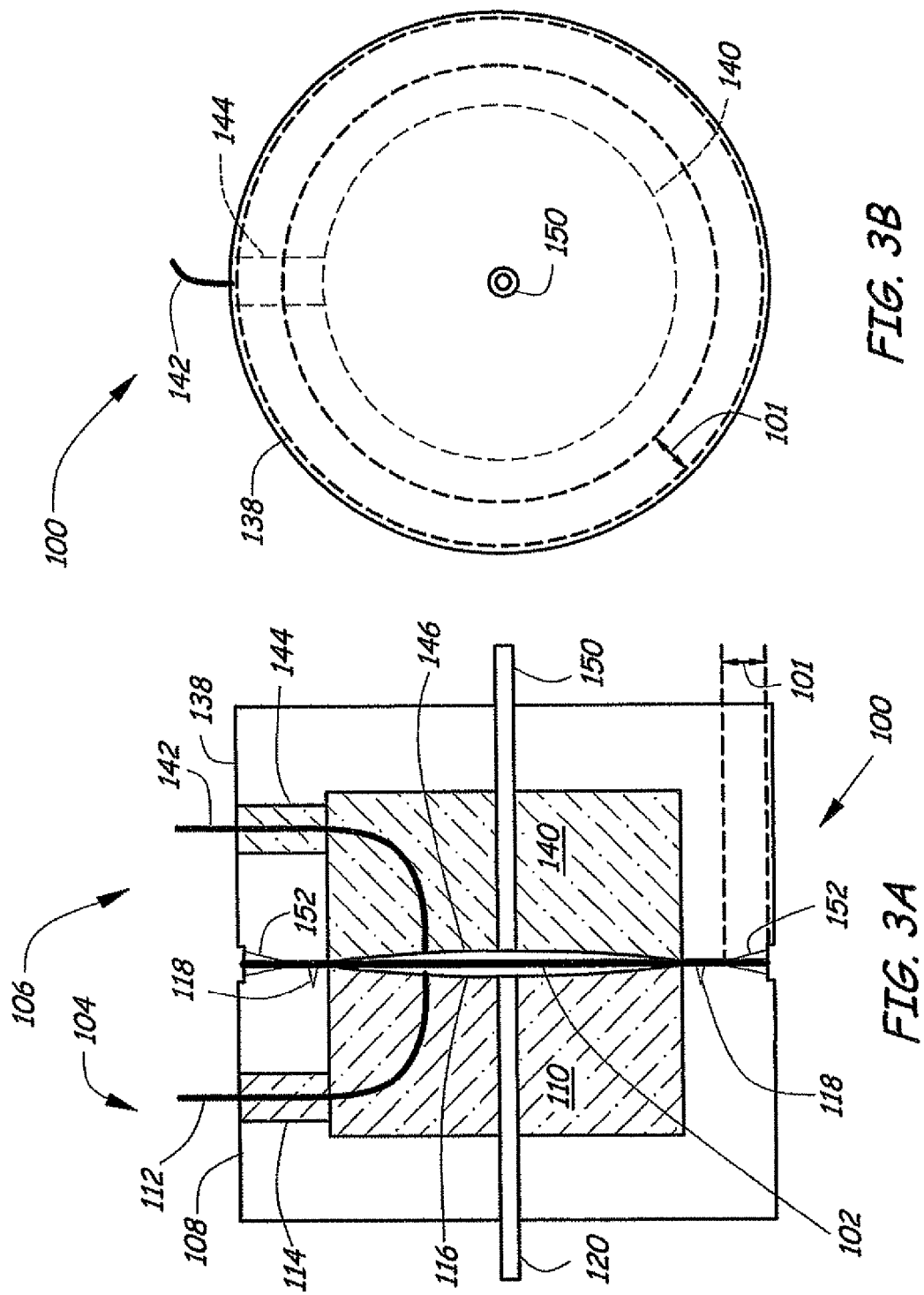
FIGS. 3A, 3B, 4 illustrate a pressure sensor that is welded with a weld penetration depth that is controlled by use of a test block.

FIG. 2 illustrates a block diagram of a process variable transmitter 500 that includes a welded pressure sensor 502. The welded pressure sensor 502 is welded with a weld 504 that has a weld penetration depth that is controlled by the use of a test block. The test block is described in more detail below in connection with an example illustrated in FIGS. 6-9. The pressure sensor 502 is described in more detail below in connection with an example illustrated in FIGS. 3A, 3B, 4. The pressure sensor 502 is coupled by capillary tubes 506, 508 to high and low side isolator assemblies 510, 512 that are part of the transmitter 500. Differential process pressure from the pressure flange 168 is applied to the isolator assemblies 510, 512. The isolator assemblies 510, 512 and the capillary tubes 506, 508 are filled with oil that couples pressure to the pressure sensor 502.

Sensor circuitry 516 couples to sensor 504 and provides a compensated sensor signal to measurement circuitry 524. A process variable output is provided which is related to the sensed pressure. The output can be, for example, over a two wire process control loop, a wireless output, or based upon another communication technique.

FIG. 3A illustrates a front cross-sectional view and FIG. 3B illustrates a side view of a pressure sensor 100. The pressure sensor 100 is a production part (or "work piece") that is produced in large quantities using automated production methods.

The pressure sensor 100 comprises a metal pressure sensor diaphragm 102. The pressure sensor 100 comprises a left cell cup assembly 104 and a right cell cup assembly 106. The left cell cup assembly 104 comprises a generally round metal cup 108 surrounding an electrically insulating concentric ceramic core 110. A metal wire 112 is embedded in the electrically insulating ceramic core 110. The metal wire 112 emerges from the metal cup 108 through a hole 114 that is filled with electrically insulating ceramic. According to one aspect, the ceramic comprises glass. The metal wire 112 serves as an electrical lead of the pressure sensor 100. The left cell cup assembly 104 comprises a metallization 116 on the ceramic core 110. The metallization 116 is electrically connected to the metal wire 112 and serves as a capacitor plate. The diaphragm 102 is welded to the metal cup 108 at a circular weld 118. The left cell cup assembly 104 comprises a capillary tube 120. The capillary tube 120 serves as an inlet for a first pressurized fluid.

The right cell cup assembly 106 comprises a generally round metal cup 138 surrounding an electrically insulating concentric ceramic core 140. A metal wire 142 is embedded in the electrically insulating ceramic core 140. The metal wire 142 emerges from the metal cup 138 through a hole 144 that is filled with electrically insulating ceramic. The metal wire 142 serves as an electrical lead of the pressure sensor 100. The right cell cup assembly 106 comprises a metallization 146 on the ceramic core 140. The metallization 146 is electrically connected to the metal wire 142 and serves as a capacitor plate. The right cell cup assembly 106 comprises a capillary tube 150. The capillary tube 150 serves as an inlet for a second pressurized fluid.

The left cell cup assembly 104 (including the diaphragm 102) and the right cell cup assembly 106 are welded together at a weld 152 by a welding process. The weld 152 is continuous weld along a circular path that seals the pressure sensor 100. As described in more detail below in connection with FIG. 4, the weld 152 is subjected to considerable force when the pressure sensor 100 is pressurized during use in sensing pressure. The weld 152 has a weld penetration depth 101 that is controlled by the use of a test block. According to one embodiment, the control is accomplished as part of a statistical process control (SPC) procedure in manufacturing a process transmitter.

Figure 4:
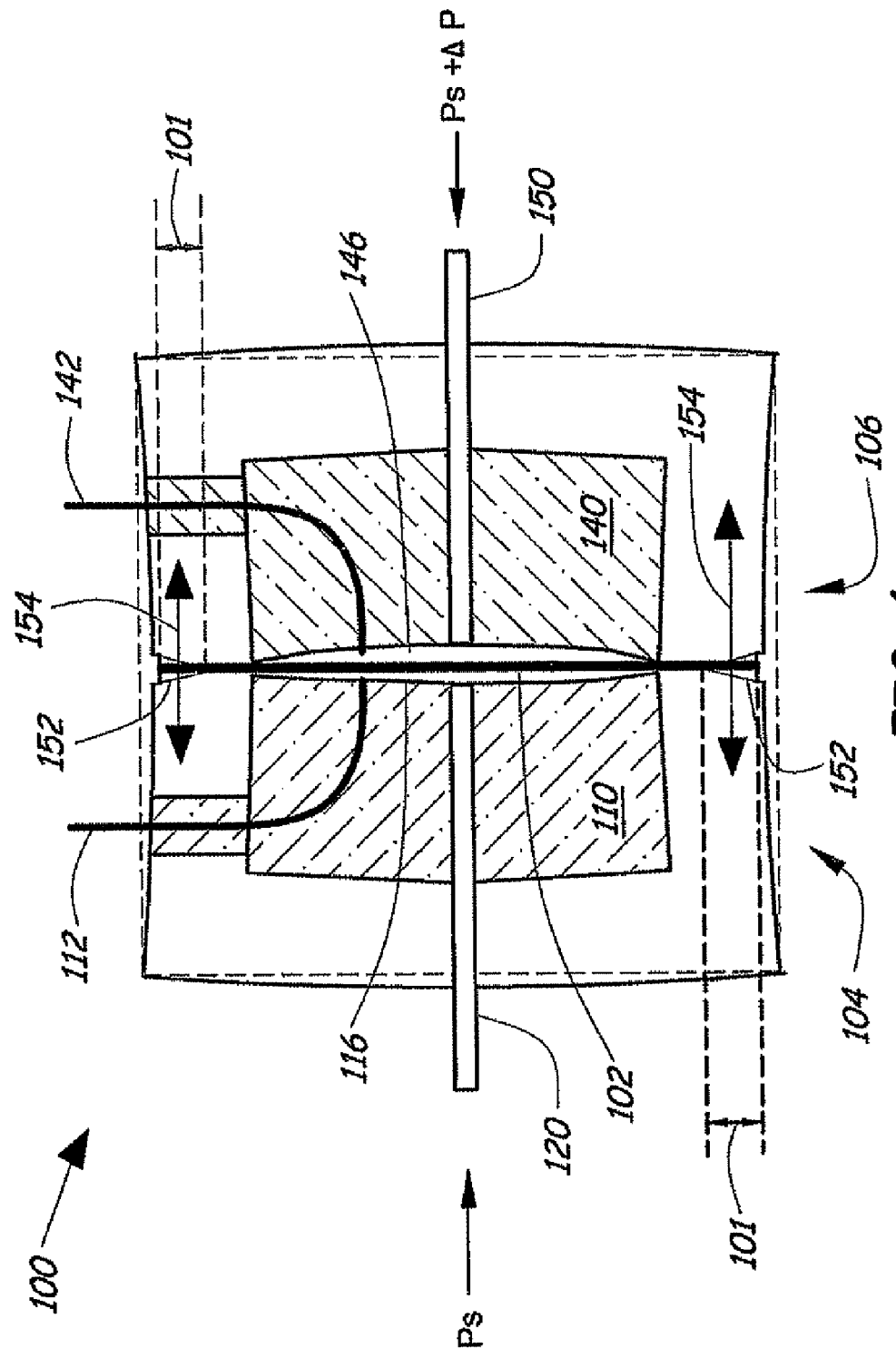

FIG. 4 illustrates the pressure sensor 100 during use in sensing pressure. A static pressure Ps (also called line pressure) is applied to the pressure sensor 100 through the capillary tube 120. A second pressure Ps+ΔP is applied to the pressure sensor 100 through the capillary tube 150. The diaphragm 102 deflects in response to the pressure difference (Ps+ΔP)−(Ps)=ΔP. The deflection of the diaphragm is sensed capacitively and the pressure sensor 100 provides an electrical output at leads 112,142 that is representative of the pressure difference ΔP.

The shapes of the left and right cell cup assemblies 104, 106 are slightly distorted by the applied pressures as they increase. The distortion is shown greatly exaggerated in FIG. 4. The weld 152 is subject to tension force along line 154 as illustrated due to the pressurization of the pressure sensor 100 by static pressure Ps. The weld 152 is also subject to a twisting force due the distortion from pressurization. The weld penetration depth 101 of the weld 152 is tested and carefully controlled so that the weld penetrates deeply enough so that the weld 152 is strong, but not so deeply that the weld damages the ceramic 110, 140 or the metallizations 116, 146. The control of the weld penetration depth 101 ensures that the weld 152 of pressure sensor 100 has enough weld penetration depth that it can withstand application of overpressure in factory testing and in field usage. The control of the weld penetration depth 101 ensures that the welding does not penetrate too deeply and damage internal working parts of the pressure sensor 100.

Figure 5:
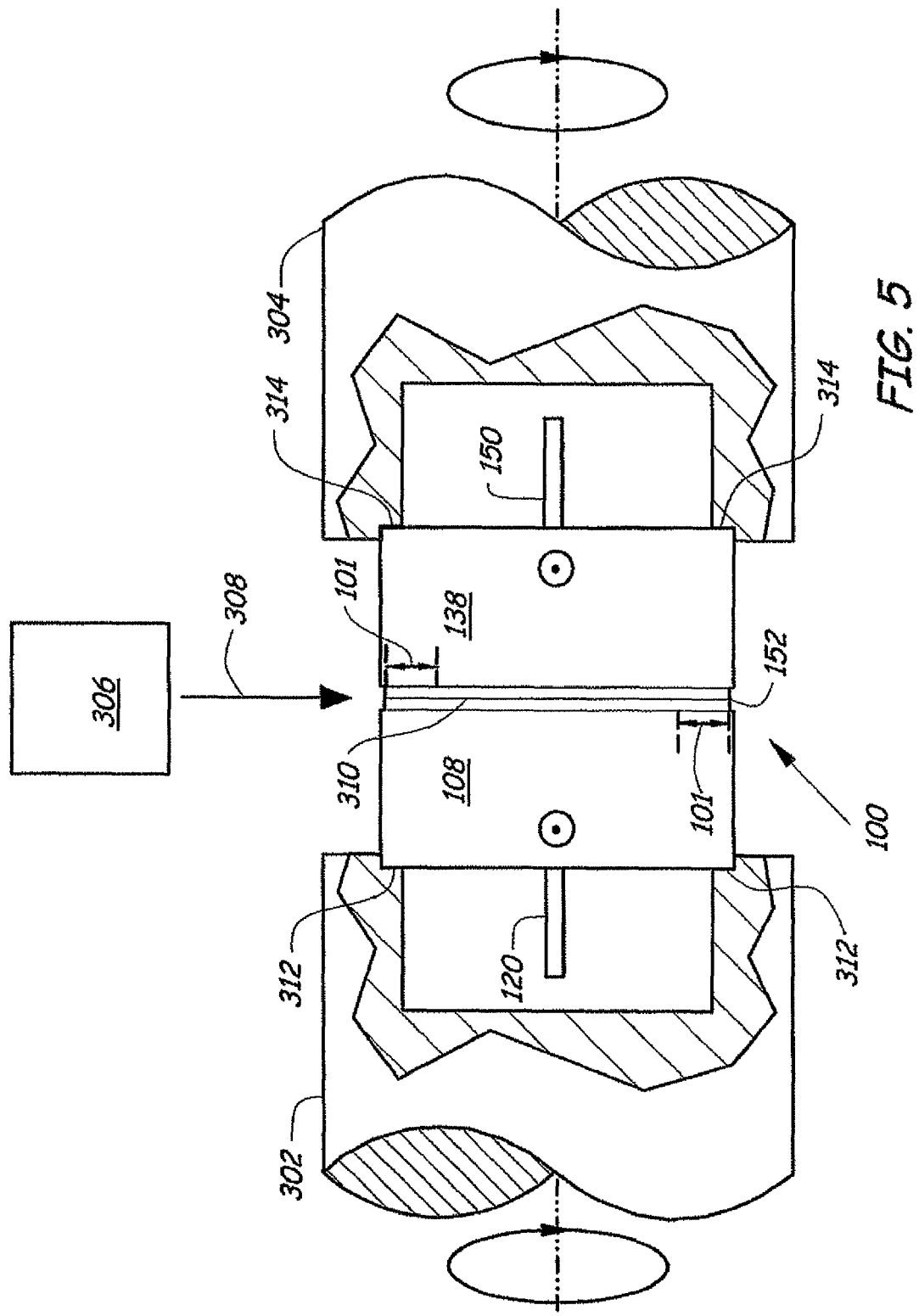
FIG. 5 illustrates a production holding fixture for welding of test blocks and production pressure sensors.

FIG. 5 illustrates the pressure sensor 100, which is a production part, mounted and clamped between two rotary chucks 302, 304 which together comprise a production holding fixture. A laser welder 306 emits a laser beam 308 that heats metal in the pressure sensor 100 to form the weld 152 in a production welding process. The depth of penetration (FIG. 4 at 101) is controllable by adjustment of power output and other controls on the laser welder 306. The rotary chucks 302, 304 rotate so that the weld 152 follows a production welding path 310. The rotary chucks 302, 304 exert an axial compression force on the pressure sensor 100 to hold the pressure sensor 100 in place during the welding process. The pressure sensor 100 comprises a first production mounting surface 312 that contacts the first rotary chuck 302. The pressure sensor 100 comprises a second production mounting surface 314 that contacts the second rotary chuck 304. As illustrated, the mounting surfaces 312, 314 preferably comprise opposing annular surfaces on the pressure sensor 100 that are in contact with the rotary chucks 302, 304. The rotary chucks 302. 304 are pressed toward the pressure sensor 100 to clamp the pressure sensor 100 in place during rotational welding.

In order to qualify the welding process, the depth of penetration 101 of the weld 152 had been destructively sampled during production. Samples of the pressure sensor 100 were cut in half (sectioned) in order to expose a cross section of the weld for visual inspection. This inspection process was a destructive testing process in that the samples of pressure sensor 100 are not usable and are discarded. However, with the present method, samples of pressure sensor 100 are not destructively tested as part of routine quality control procedures. In the present method, test blocks are welded in the fixture and melt thru on the test block is inspected in order to control quality of the welds in the pressure sensors 100.

Destructive methods of qualifying the welding process are dangerous, expensive and time consuming. These problems are significantly reduced by a non-destructive testing method described below in connection with FIGS. 6-10 in which a test block 400 is mounted, clamped and welded in substantially the same way as the production part 100. The test block 400 is then inspected, without the need for cutting and polishing, and without the destruction of a pressure sensor.

Figure 6B:
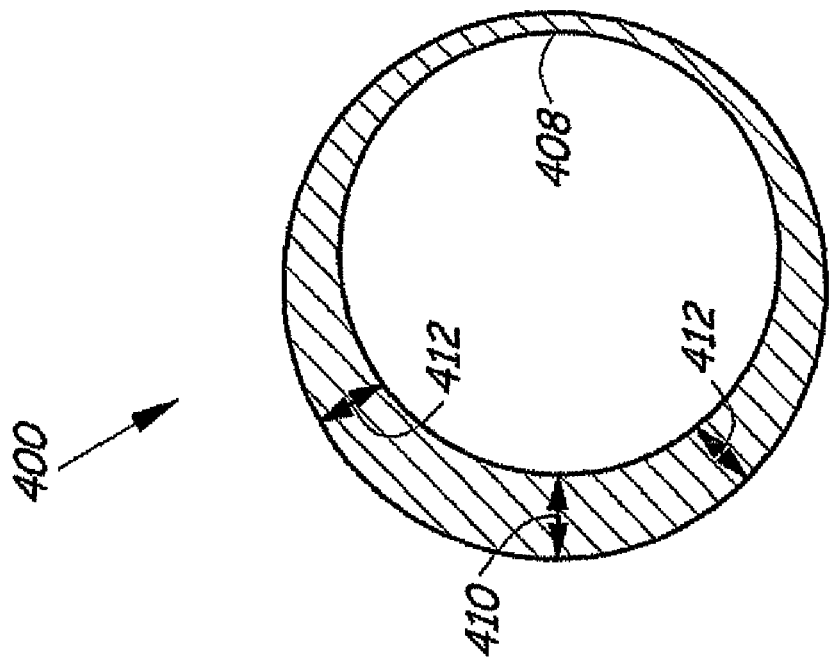
FIGS. 6A, 6B, 7, 8 and 9 illustrate an embodiment of a test block.
Figure 6A:
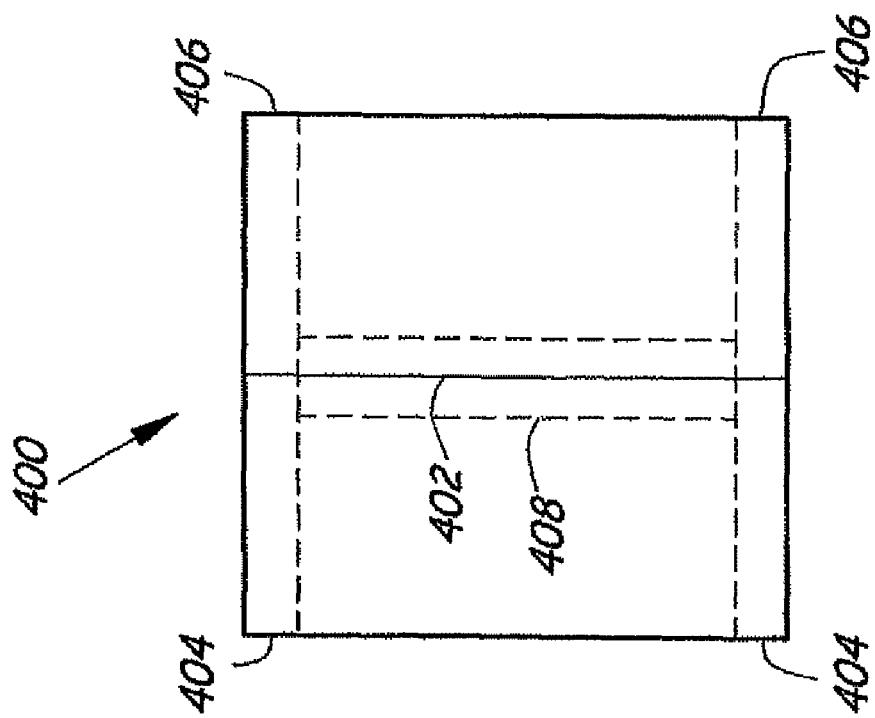

FIGS. 6A, 6B illustrate an embodiment of a test block 400. The test block 400 simulates a production pressure sensor (such as pressure sensor 100) relative to a welding process of the production pressure sensor.

The test block 400 comprises a test welding path 402 on the test block 400 that replicates a production welding path (such as path 310 in FIG. 5) on the production pressure sensor. The test block 400 comprises test mounting surfaces 404, 406 on the test block 400 that replicate production mounting surfaces (such as surfaces 312, 314 in FIG. 5) on the production pressure sensor.

The test block comprises a melt-thru surface 408 on the test block 400 that underlies the test welding path 402. The melt-thru surface 408 is spaced apart from the test welding path 402 by a spacing 410 that decreases along a length of the test welding path. The spacing 410 varies from more than a standard weld penetration depth 412 to less than the standard weld penetration depth 412. The inner melt-thru surface 408 is eccentric relative to the test welding path 402 on an outer surface of the test block 400. According to one aspect, the test block 400 is formed of the same type of metal as the metal cups 108, 138 in the pressure sensor of FIG. 3. According to one aspect, the test block 400 is formed of a metal alloy that replicates a metal alloy used in the pressure sensor.

Figure 7:
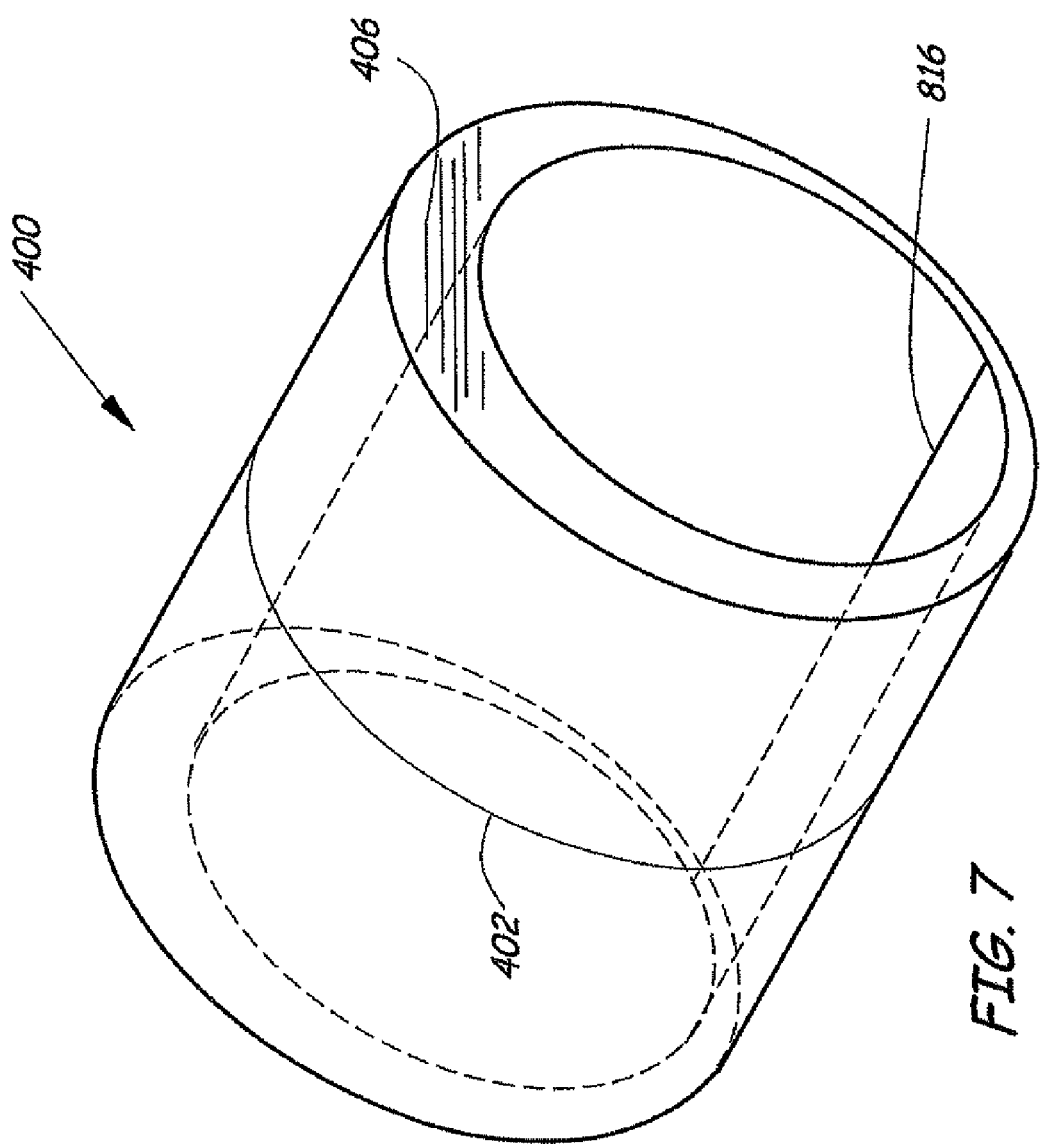
Figure 8:
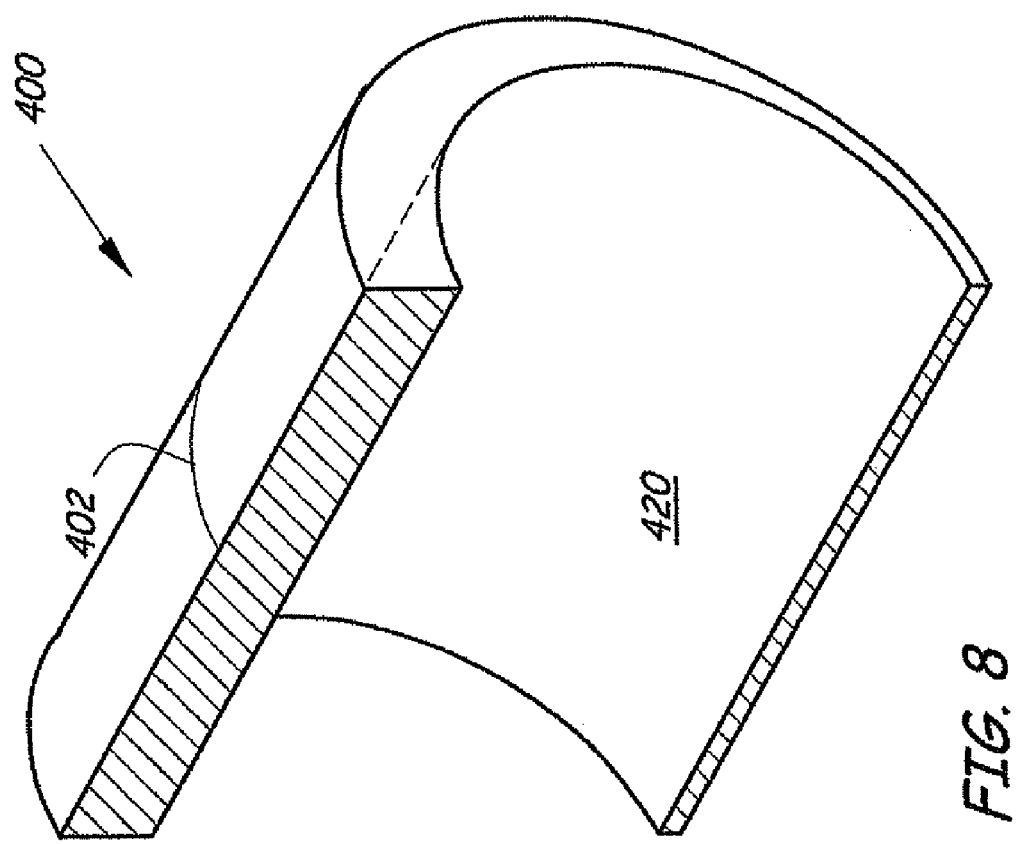

FIG. 7 illustrates an oblique view of the test block 400 shown in FIG. 6. The test welding path 402 is a continuous closed circular path around the circumference of the test block 400. According to one aspect, the test block 400 comprises a reference mark 816 that is described in more detail below in connection with FIG. 10. FIG. 8 illustrates an oblique cross-sectional view of the test block 400 before a welding process. According to one aspect, an interior surface 420 of the test block 400 has an essentially uniform smooth appearance that is free of variations in appearance before welding.

Figure 9:
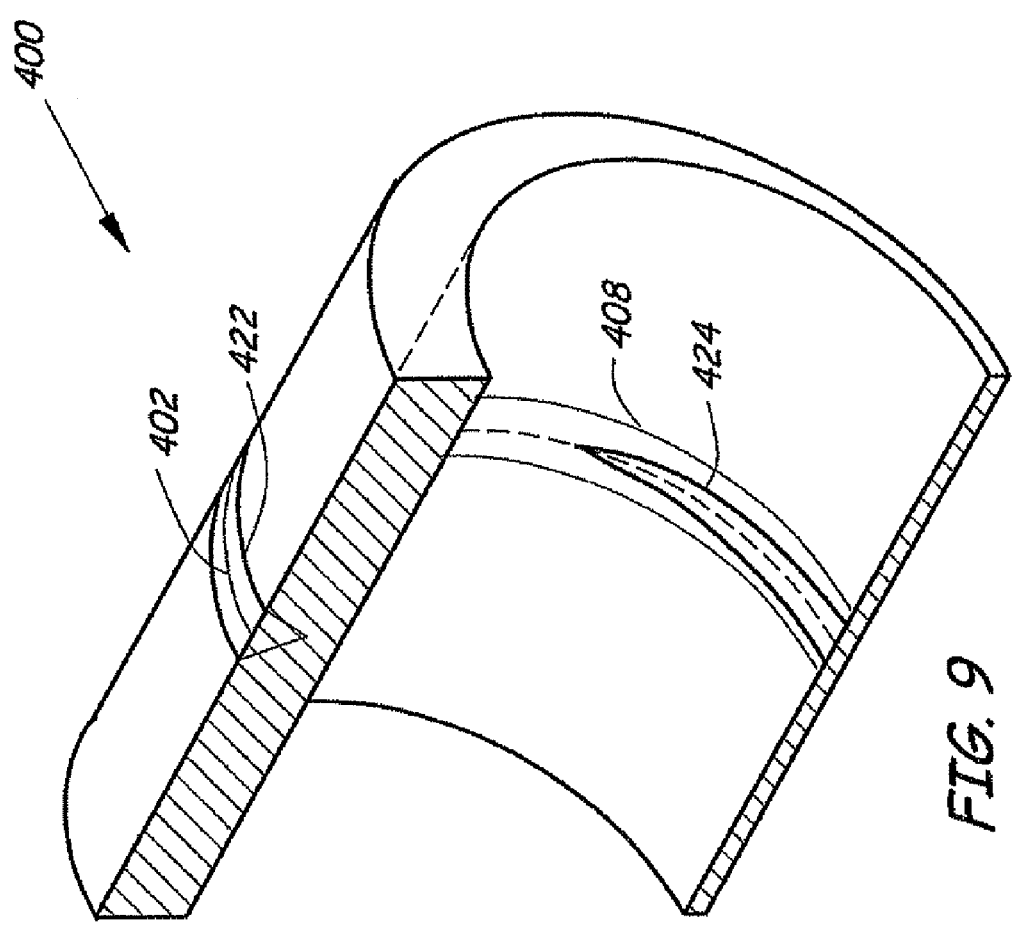

FIG. 9 illustrates an oblique cross-sectional view of the test block 400 after a welding process has applied a weld 422. The interior surface 420 of the test block 400 displays a discolored region 424 in the melt through region 408 where there is melt through discoloration due to the weld 422. The discolored region 424 is present only where the weld penetration depth 412 exceeds the spacing 410. The weld 422 penetrates through to the interior surface 420 in thinner regions and stops penetrating where the thickness exceeds the weld penetration depth 412. The use of an eccentric hole in the test block 400 allows a numeric penetration measurement that identifies the thickness of a wall of the test block 400 where the weld stops penetrating.

Referring now to FIGS. 5-9, a method of qualifying a welding process (FIG. 5) on a pressure sensor 100 (FIGS. 3A, 3B) is provided. The method includes providing a test block 400 that simulates the pressure sensor 100 relative to the welding process. The method includes shaping a test welding path 402 on the test block that replicates a production welding path 310 on the pressure sensor 100.

The method includes shaping test mounting surfaces 404, 406 on the test block 400 that replicate pressure sensor mounting surfaces 312, 314 on the pressure sensor 100. The method includes shaping a melt-thru surface 408 on the test block 400 that underlies the test welding path 402.

The method includes spacing the melt-thru surface 408 apart from the test welding path 402 by a spacing 410 which decreases along a length of the test welding path 402. The spacing 410 varies from more than a standard weld penetration depth 412 to less than the standard weld penetration depth 412.

The method includes mounting the test mounting surfaces 404, 406 to a production holding fixture 302, 304. The method includes welding the test block 400 along the test welding path 402 using the welding process.

The method includes removing the test block 400 from the production holding fixture 302, 304 and inspecting the melt-thru surface 408 to measure a numerical value of a spacing 412 where the welding penetrates the melt-thru surface 408.

According to one aspect, the melt through surface 408 is coated with a temperature sensitive coating in order to increase visibility of melt through from the welding process. According to another aspect, the melt through surface 408 is etched (either before or after welding) in order to increase visibility of melt through from the welding process. According to yet another aspect, the melt-thru surface 408 is polished to provide a mirror finish prior to welding.

Measurement of weld penetration depth 412 using the presently disclosed non-destructive method correlate well with results from previous destructive methods discussed above in connection with FIG. 5.

Figure 10A:
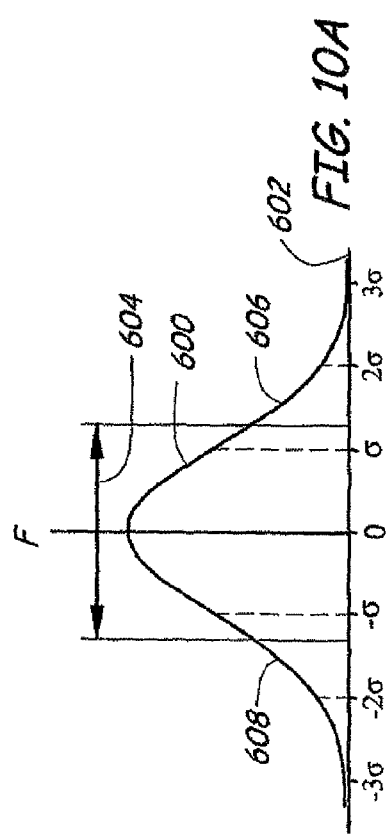
FIGS. 10A, 10B illustrate comparable statistical frequency distributions of weld penetration depths without use of test blocks (FIG. 10A) and with use of a test blocks (FIG. 10B).
Figure 10B:
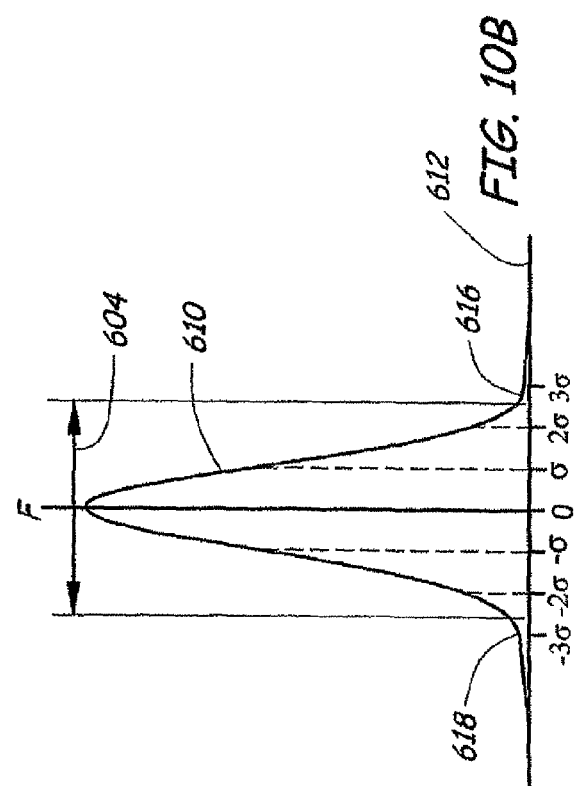

FIGS. 10A, 10B illustrate comparable statistical frequency distributions of weld penetration depths without use of a test block (FIG. 10A) and with use of a test block (FIG. 10B).

FIG. 10A illustrates an exemplary statistical frequency distribution 600 of weld penetration depths in a pressure sensor production process that does not use a test block. A horizontal axis 602 represents deviations from a nominal, desired weld penetration depth. A weld with a penetration depth that is equal to a desired weld penetration depth, for example, is present in the frequency distribution 600 at "0" on the horizontal axis 602. A horizontal interval 604 represents a range of deviations from the desired weld penetration depth that is acceptable to ensure adequate strength of the weld in overpressure conditions, without excessive depth that could damage internal parts of a pressure sensor. As illustrated, the frequency distribution 600 approximates a normal distribution.

FIG. 10B illustrates an exemplary statistical frequency distribution 610 of weld penetration depths in a pressure sensor production process that uses a test block. A horizontal axis 612 represents deviations from a nominal, desired weld penetration depth. A weld with a penetration depth that is equal to a desired weld penetration depth, for example, is present in the frequency distribution 610 at "0" on the horizontal axis 612. A horizontal interval 604 represents a range of deviations from the desired weld penetration depth that is acceptable to ensure adequate strength of the weld in overpressure conditions, without excessive depth that could damage internal parts of a pressure sensor. The horizontal interval 604 is the same interval in both FIGS. 10A and 10B. As illustrated, the frequency distribution 610 approximates a normal distribution.

The use of the test block permits tests of weld penetration depth in pressure sensors to be performed much more rapidly and at a much lower cost. Sampling can be done more frequently when the test block is used and feedback for control of the production process is available more quickly and frequently so that deviations from the nominal, desired penetration depth are greatly reduced.

It is to be understood that even though numerous aspects of various embodiments of the invention are set forth in the foregoing description, this disclosure is illustrative only, and changes may be made in form and detail without departing from the scope and spirit of the present invention. The present invention is not limited to the specific pressure sensor configuration shown herein and is applicable to other sensor configurations as well as other welds used in a process device such as a process variable transmitter. Further, the invention is applicable to any work piece that includes a weld and is not limited to a pressure sensor.

What is claimed is:

1. A test block that simulates a work piece relative to a welding process of the work piece, the test block comprising:
    a test welding path on the test block that replicates a production welding path on an outer surface of the work piece;
    a melt-thru surface on the test block that underlies the test welding path, the melt-thru surface being spaced apart from the test welding path by a spacing that decreases along a length of the test welding path, the spacing varying from more than a standard weld penetration depth to less than the standard weld penetration depth.

2. The test block of claim 1, wherein the test block simulates a work piece that includes ceramic material.

3. The test block of Claim wherein a laser weld is formed in the test block.

4. The test block of claim 1, including test mounting surfaces which are parallel surfaces.

5. The test block of claim 4, wherein the test mounting surfaces comprise clamped surfaces.

6. The test block of claim 1 wherein the melt-thru surface comprises an internal surface of a cylinder that is eccentric relative to an outer cylindrical surface of the test block.

7. The test block of claim 1, wherein the melt-thru surface is an etched surface.

8. The test block of claim 1, wherein the melt-thru surface comprises a temperature sensitive coating.

9. A method of qualifying a welding process on a production work piece, the method comprising steps of:
providing a test block that simulates the production work piece relative to the welding process;
shaping a test mounting surface on the test block that replicates a production mounting surface on the production work piece;
shaping a melt-thru surface on the test block that underlies the test welding path;
spacing the melt-thru surface apart from the test welding path by a spacing which decreases along a length of the test welding path, the spacing varying from more than a standard weld penetration depth to less than the standard weld penetration depth;
mounting the test mounting surface to a production holding fixture;
welding the test block along the test welding path using the welding process;
removing the test block from the production holding fixture; and
inspecting the melt-thru surface to measure a numerical value of a spacing where the welding penetrates the melt-thru surface.

10. The method of claim 9 further comprising step of shaping the test block to simulate a differential pressure sensor.

11. The method of claim 9 further comprising step of rotating the test block during the welding process.

12. The method of claim 9 further comprising step of welding the test block with a laser weld.

13. The method of claim 9 further comprising step of arranging test mounting surfaces to be parallel with one another.

14. The method of claim 13 further comprising step of clamping the test mounting surfaces in the production holding fixture.

15. The method of claim 9 further comprising step of shaping the melt-thru surface as an internal surface of a cylinder.

16. The method of claim 9 further comprising step of etching the melt-thru surface is an etched surface.

17. The method of claim 9 further comprising step of coating the melt-thru surface with a temperature sensitive coating.

* * * * *